US012591495B2

(12) United States Patent
Luo et al.

(10) Patent No.: US 12,591,495 B2
(45) Date of Patent: Mar. 31, 2026

(54) BURN-IN APPARATUS FOR TESTING MULTI-MEDIA PRODUCTS BASED ON A TEST FILE GENERATED BY MATCHING A SIGNATURE AND LOG

(71) Applicant: AMLOGIC (SHANGHAI) CO., LTD, Shanghai (CN)

(72) Inventors: Yuan Luo, Shanghai (CN); Fengping Xiong, Shanghai (CN); Kang Jiang, Shanghai (CN)

(73) Assignee: AMLOGIC (SHANGHAI) CO., LTD, Shanghai (CN)

( * ) Notice: Subject to any disclaimer, the term of this patent is extended or adjusted under 35 U.S.C. 154(b) by 66 days.

(21) Appl. No.: 18/694,892

(22) PCT Filed: Aug. 30, 2022

(86) PCT No.: PCT/CN2022/115950
§ 371 (c)(1),
(2) Date: Mar. 22, 2024

(87) PCT Pub. No.: WO2023/045720
PCT Pub. Date: Mar. 30, 2023

(65) Prior Publication Data
US 2024/0403180 A1     Dec. 5, 2024

(30) Foreign Application Priority Data
Sep. 24, 2021    (CN) .......................... 202111119709.X

(51) Int. Cl.
*G06F 11/273* (2006.01)
*G06F 11/22* (2006.01)
*H04L 67/125* (2022.01)

(52) U.S. Cl.
CPC ............ *G06F 11/273* (2013.01); *G06F 11/22* (2013.01); *H04L 67/125* (2013.01)

(58) Field of Classification Search
CPC .... G06F 11/27; G06F 11/273; G06F 11/2733; G06F 11/2736; G06F 11/3688;
(Continued)

(56) References Cited

U.S. PATENT DOCUMENTS 9,449,337 B2 *  9/2016  Baker .................... G06Q 30/02
12,292,808 B2 *  5/2025  Gunter .................. G06F 11/273
(Continued)

FOREIGN PATENT DOCUMENTS

CA        2297994 A1 *  8/2001  .......... G06F 11/3688
CN    101448172 A      6/2009
(Continued)

OTHER PUBLICATIONS

"Integrated Match Specification Test Mechanism" by IBM published Mar. 13, 2006 https://priorart.ip.com/IPCOM/000134613 (Year: 2006).*
(Continued)

*Primary Examiner* — Joseph O Schell
(74) *Attorney, Agent, or Firm* — Knobbe, Martens, Olson & Bear, LLP

(57) ABSTRACT

The present invention provides a multimedia product burn-in apparatus configured to test several multimedia products, including: a controller, configured to issue a running command; and a network server, connected to the controller and the several multimedia products respectively, the network server storing a test file, and the test file being generated by matching a signature and a log of the multimedia product, where the network server receives the running command to generate a control command, sends the test file to the several multimedia products according to the control command, and performs batch testing on the several multimedia products. The multimedia product burn-in apparatus saves a tester from repeatedly making individual changes to each multi- (Continued)

media product, achieves automated testing, and solves the problem of high manpower, material, and time costs caused by batch bum-in of the multimedia products in research and development and design stages.

15 Claims, 4 Drawing Sheets

(58) Field of Classification Search
CPC ........ G06F 21/305; G06F 21/44; G06F 21/45; H04L 43/065; H04W 24/06; H04W 24/08
See application file for complete search history.

(56) References Cited

U.S. PATENT DOCUMENTS

| | | | | |
|---|---|---|---|---|
| 2003/0079082 A1* | 4/2003 | Sicola | .................. | G06F 3/0689 |
| | | | | 711/170 |
| 2005/0154553 A1* | 7/2005 | Wheeler | ............. | H04L 12/2809 |
| | | | | 702/123 |
| 2010/0058409 A1 | 3/2010 | Chapman et al. | | |

| | | | | |
|---|---|---|---|---|
| 2011/0145653 A1* | 6/2011 | Broadfoot | ........... | G06F 11/3604 |
| | | | | 714/E11.217 |
| 2012/0151002 A1* | 6/2012 | Lin | ......................... | H04L 67/06 |
| | | | | 709/218 |
| 2017/0279945 A1* | 9/2017 | Parsons | .................. | A47B 87/00 |
| 2019/0253319 A1* | 8/2019 | Kampanakis | .......... | G06N 5/025 |
| 2020/0293436 A1* | 9/2020 | Carames | ............. | G06F 11/3419 |
| 2022/0365868 A1* | 11/2022 | Rao | ...................... | G06F 11/3612 |
| 2025/0265175 A1* | 8/2025 | Tajima | .................... | G06F 11/36 |

FOREIGN PATENT DOCUMENTS

| | | |
|---|---|---|
| CN | 105204992 A | 12/2015 |
| CN | 206584345 U | 10/2017 |
| CN | 209496092 U | 10/2019 |
| CN | 111813687 A | 10/2020 |

OTHER PUBLICATIONS

Search Report and Written Opinion received in International Application No. PCT/CN2022/115950 dated Oct. 30, 2022.
Office Action issued in Chinese Application No. 202111119709.X, dated Jul. 9, 2025.

* cited by examiner

BURN-IN APPARATUS FOR TESTING MULTI-MEDIA PRODUCTS BASED ON A TEST FILE GENERATED BY MATCHING A SIGNATURE AND LOG

TECHNICAL FIELD

Embodiments of the present invention relate to the field of test cabinets, particularly a multimedia product burn-in apparatus.

BACKGROUND

Currently, mainstream multimedia products include a television, a multimedia digital box, a computer, a tablet computer, a mobile phone, and the like. Products of such types undergo a long period of research and development and testing before being delivered to a customer. Interfaces recognized by the public and manufacturers on the market include a USB, a Type-C, an HDMI, a headphone jack, a network port, and the like.

In research and development and design stages of an electronic product, there is a long-term burn-in experiment to ensure hardware quality, software stability, and usability of the electronic product, so that it is ensured that the product delivered to a user can be used normally for a long time. However, in testing and experimental stages, interfaces on a personal computer used by a developer and a tester are limited. Therefore, dozens or hundreds of products cannot be monitored and processed at the same time. If there is a change to environment or software, the tester needs to perform repetitive work in batches for this change. Therefore, the design of this product is to reduce the manpower, material, and time costs caused by batch burn-in of the electronic product in the research and development and design stages.

SUMMARY

The problem solved by embodiments of the present invention is to provide a multimedia product burn-in apparatus, to solve the problem of large manpower, material, and time costs caused by batch burn-in.

In order to solve the foregoing problem, the embodiments of the present invention provide a multimedia product burn-in apparatus configured to test several multimedia products, including: a controller, configured to issue a running command; and a network server, connected to the controller and the several multimedia products respectively, the network server storing a test file, and the test file being generated by matching a signature and a log of the multimedia product, where the network server receives the running command to generate a control command, sends the test file to the several multimedia products according to the control command, and performs batch testing on the several multimedia products.

Optionally, the network server includes: a processing server, receiving the running command and generating the control command; and a router, configured to store the test file and send the test file to the several multimedia products in response to the control command.

Optionally, the router configures running environment and running software of the several multimedia products according to the control command.

Optionally, the burn-in apparatus includes: a cabinet, including: a first side plate; a second side plate, arranged parallel to and spaced apart from the first side plate in a first direction; a top support plate, located on top portions of the first side plate and the second side plate, the top support plate being connected to the top portions of the first side plate and the second side plate respectively in the first direction; and a display, located on side walls of the first side plate and the second side plate, the display being connected to the several multimedia products and configured to play video information provided by the several multimedia products.

Optionally, the burn-in apparatus includes: a multiple input and one output switch, including an input end connected to the several multimedia products and an output end connected to the display.

Optionally, the burn-in apparatus includes: a camera, connected to the network server, the camera being located on the first side plate and the second side plate, and the camera being configured to capture display playback screen and store a captured video in the network server; and a detection unit, configured to download the video stored in the network server to the controller for detection.

Optionally, the burn-in apparatus includes: a temperature control system, located on a bottom portion of the cabinet, where the temperature control system includes a hot air blower, a cold air blower, and a temperature controller connected to the hot air blower or the cold air blower.

Optionally, the burn-in apparatus includes: a heat preservation apparatus, located on two sides of the top support plate in a second direction, the second direction being perpendicular to the first direction.

Optionally, the heat preservation apparatus includes a roller shutter mechanism and an insulation curtain connected to an output end of the roller shutter mechanism, where the roller shutter mechanism includes: a support base, arranged at intervals at the two ends of the top support plate in the first direction; a scroll, rotatably arranged in the support base; a turning motor, including an output end fixedly connected to an end of the scroll and configured to provide rotation of the scroll; and a connection mechanism, fixed to a surface of the scroll in the first direction and configured to connect the insulation curtain.

Optionally, the burn-in apparatus includes: a wire groove extending in the first direction, located between the first side plate and the second side plate and fixedly connected to the first side plate and the second side plate, the wire groove including a weak current conduit and a strong current conduit spaced apart from the weak current conduit; a first power supply, arranged on the first side plate, a wire or a signal wire drawn out of the first power supply being located in the weak current conduit; and a second power supply, arranged on the second side plate, a wire or a signal wire drawn out of the second power supply being located in the strong current conduit, voltage of the second power supply being higher than voltage of the first power supply.

Optionally, the burn-in apparatus includes: several distributed test racks, and the distributed test racks are arranged on opposite side walls of the first side plate and the second side plate; and the distributed test racks include: a support plate, fixedly connected to the opposite side walls of the first side plate and the second side plate; a plurality of partition plates, arranged on the support plate at intervals in the first direction, the partition plates extending in the second direction, and a center of the partition plates in the second direction is provided with an opening; and a power supply module, arranged in the opening of the plurality of partition plates in the first direction, the power supply module including a plurality of types of jacks and being configured to supply power to the several multimedia products at the same time.

Optionally, the burn-in apparatus includes: a self-locking roller, arranged at a bottom portion of the cabinet.

Optionally, the controller includes a personal computer.

Compared with the conventional technologies, the technical solutions in the embodiments of the present invention have the following advantages: The network server in the multimedia product burn-in apparatus provided in this embodiment of the present invention is configured to store a test file, the test file is generated by matching a signature and a log of the multimedia products, and the network server is connected to the controller and the several multimedia products respectively. In a burn-in process, the network server receives the running command to generate a control command, sends the test file to the several multimedia products according to the control command, and performs batch testing on the several multimedia, which avoids a tester from repeatedly making individual changes to each multimedia product, achieves automated testing, and solves the problem of high manpower, material, and time costs caused by batch burn-in of the multimedia products in research and development and design stages.

Optionally, in an optional solution, the network server includes: a processing server, receiving the running command and generating the control command; and a router, configured to store the test file and send the test file to the several multimedia products in response to the control command. In the burn-in process, the control command is generated by the processing server based on the running command of the controller. Therefore, in a test process, the several multimedia products receive the test file through the running command of the controller, which achieves automated testing, and solves the problem of high manpower, material, and time costs caused by batch burn-in of the multimedia products in research and development and design stages.

In an optional solution, the router configures running environment and running software of the several multimedia products according to the control command. The control command is generated by the processing server based on the running command of the controller. Therefore, in the test process, the running environment and running software of the several multimedia products can be configured through the running command of the controller, which avoids a tester from repeatedly making individual changes to each multimedia product, achieves automated testing, and solves the problem of high manpower, material, and time costs caused by batch burn-in of the multimedia products in research and development and design stages.

DETAILED DESCRIPTION

It can be seen from the background that during testing and experimental stages of an electronic product, interfaces on a personal computer used by a developer and a tester are limited. Therefore, dozens or hundreds of multimedia products cannot be monitored and processed at the same time. If there is a change to environment or software, the tester needs to perform repetitive work in batches, resulting in a waste of manpower, material, and time costs.

In order to solve the foregoing problem, the embodiments of the present invention provide a multimedia product bum-in apparatus configured to test several multimedia products, including: a controller, configured to issue a running command; and a network server, connected to the controller and the several multimedia products respectively, the network server storing a test file, and the test file being generated by matching a signature and a log of the multimedia product, where the network server receives the running command to generate a control command, sends the test file to the several multimedia products according to the control command, and performs batch testing on the several multimedia products.

The network server in the multimedia product burn-in apparatus provided in this embodiment of the present invention is configured to store a test file, the test file is generated by matching a signature and a log of the multimedia products, and the network server is connected to the controller and the several multimedia products respectively. In a burn-in process, the network server receives the running command to generate a control command, sends the test file to the several multimedia products according to the control command, and performs batch testing on the several multimedia, which avoids a tester from repeatedly making individual changes to each multimedia product, achieves automated testing, and solves the problem of high manpower, material, and time costs caused by batch bum-in of the multimedia products in research and development and design stages.

Figure 1:
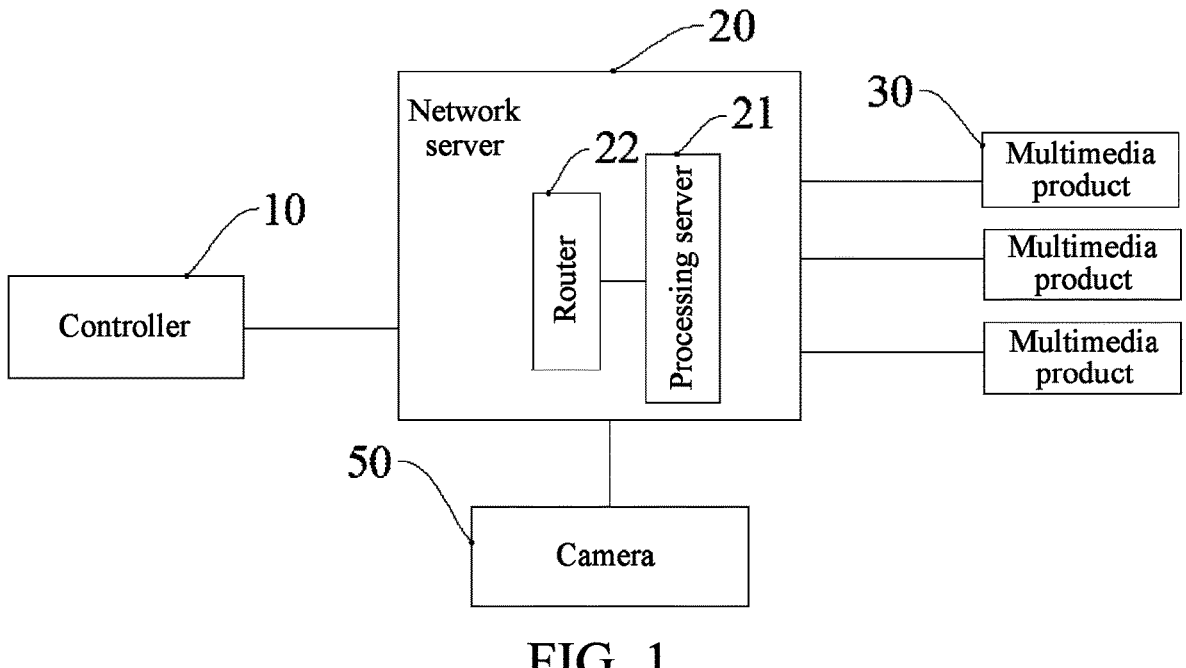
FIG. 1 is a functional block diagram of a multimedia product burn-in apparatus according to an embodiment of the present invention.

FIG. 1 is a functional block diagram of a multimedia product burn-in apparatus according to an embodiment of the present invention.

As shown in FIG. 1, a multimedia product bum-in apparatus configured to test several multimedia products 30 includes: a controller 10, configured to issue a running command; and a network server 20, connected to the controller 10 and the several multimedia products 30 respectively, the network server 20 storing a test file, and the test file being generated by matching a signature and a log of the multimedia product 30, where the network server 20 receives the running command to generate a control command, sends the test file to the several multimedia products 30 according to the control command, and performs batch testing on the several multimedia products 30.

The network server 20 in the multimedia product bum-in apparatus provided in this embodiment of the present invention is configured to store a test file, the test file is generated by matching a signature and a log of the multimedia products 30, and the network server 20 is connected to the controller 10 and the several multimedia products 30 respectively. In a burn-in process, the network server 20 receives the running command to generate a control command, sends the test file to the several multimedia products 30 according to the control command, and performs batch testing on the several multimedia products 30, which avoids a tester from repeatedly making individual changes to each multimedia product 30, achieves automated testing, and solves the problem of high manpower, material, and time costs caused by batch bum-in of the multimedia products 30 in research and development and design stages.

In this embodiment, the network server 20 includes: a processing server 21, receiving the running command and generating the control command; and a router 22, configured to store the test file and send the test file to the several multimedia products in response to the control command. In the bum-in process, the control command is generated by the processing server 21 based on the running command of the controller 10. Therefore, in a test process, the several multimedia products 30 receive the test file through the running command of the controller 10, which achieves automated testing, and solves the problem of high manpower, material, and time costs caused by batch burn-in of the multimedia products 30 in research and development and design stages.

In this embodiment, the router 22 configures running environment and running software of the several multimedia products 30 according to the control command. The control command is generated by the processing server 21 based on the running command of the controller 10. Therefore, in the test process, the running environment and running software of the several multimedia products 30 can be configured through the running command of the controller 10, which avoids a tester from repeatedly making individual changes to each multimedia product 30, achieves automated testing, and solves the problem of high manpower, material, and time costs caused by batch bum-in of the multimedia products 30 in research and development and design stages.

In this embodiment, the multimedia products 30 include but are not limited to a set-top box, a TV bare plate, a commercial display smart speaker, an IPC product, and a smart tablet computer.

In this embodiment, the controller 10 includes a personal computer. The operating software used by the personal computer may be a Windows operating system. In another embodiment, the personal computer may alternatively use a Linux system or a macOS operating system.

The processing server 21 has high security and stability.

In this embodiment, the processing server 21 includes a Linux server, and the Linux server uses the Linux system. Compared with a processing server using the Windows system, the Linux system and the Windows system both use a shell (resource manager), allowing a user to interact with a kernel. When the Linux and Windows systems are started, the shell is started by default, but the window system only has one interface and crashes if there is no response. However, there are a plurality of consoles (tty1-tty7) in the Linux system. When one console does not respond, another console can be opened to end the unresponsive console, so it is not easy to crash.

Specifically, versions used by the Linux server include but are not limited to: Red Hat Linux, Ubuntu Linux, SuSE Linux, or the like.

In this embodiment, the bum-in apparatus includes a serial interface (Serial Interface) or a network Android test bridge (ADB) and is configured to transmit the control command generated by the network server 20 to the multimedia product 30.

Specifically, the serial interface (Serial Interface) includes a COM interface; and the network Android test bridge is configured to build a bridge between the multimedia product 30 and the processing server 21.

The router 22 is a core component of a computer local area network. The router 22 is configured to store and manage shared resources in the network, such as a database, a file, an application program, and the like. The router 22 is further configured to supervise and control a network activity, perform actual management of the network, allocate system resources, understand and adjust a system operating status, close or start some resources, and the like.

In this embodiment, the test file includes but is not limited to a high-definition video source, a log, a burn-in script, and some common tools. The high-definition video source has white images or black images at intervals.

Figure 2:
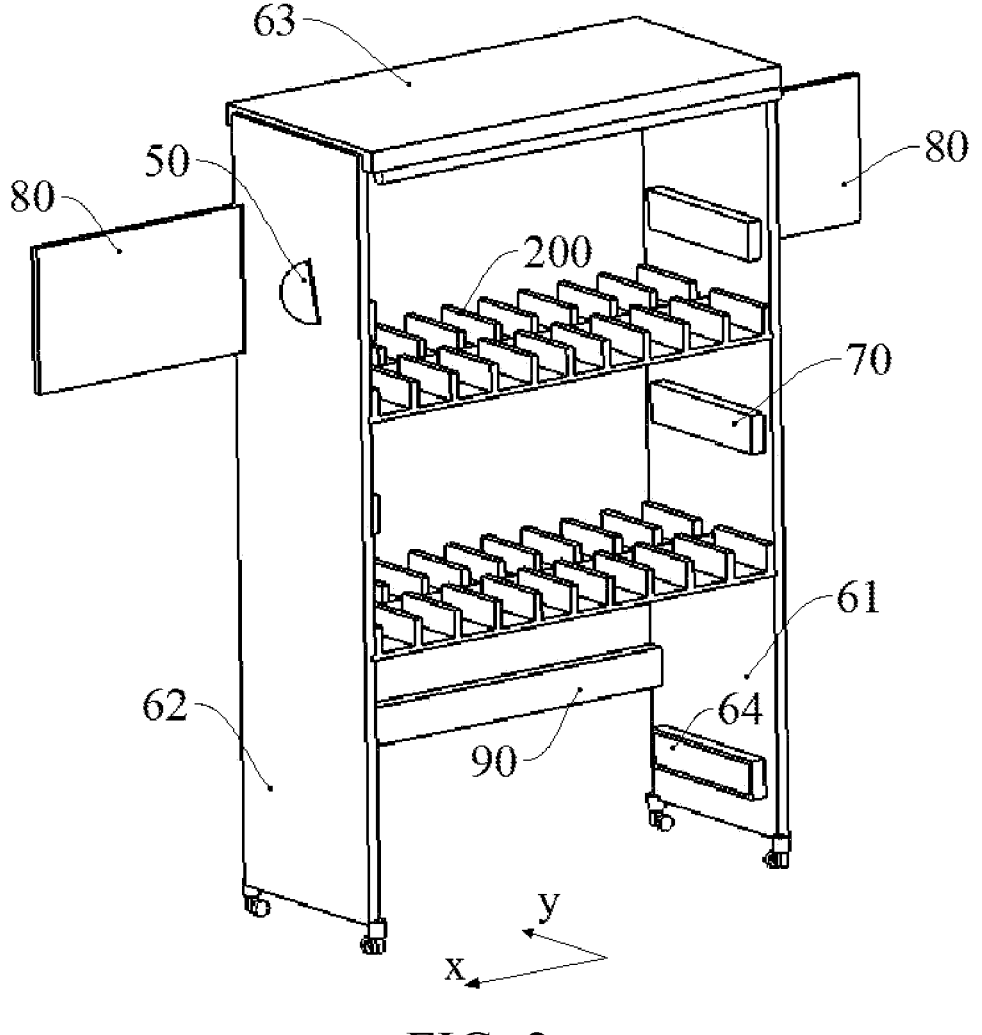
FIG. 2 is a schematic perspective view of a multimedia product burn-in apparatus according to an embodiment of the present invention.
Figure 3:
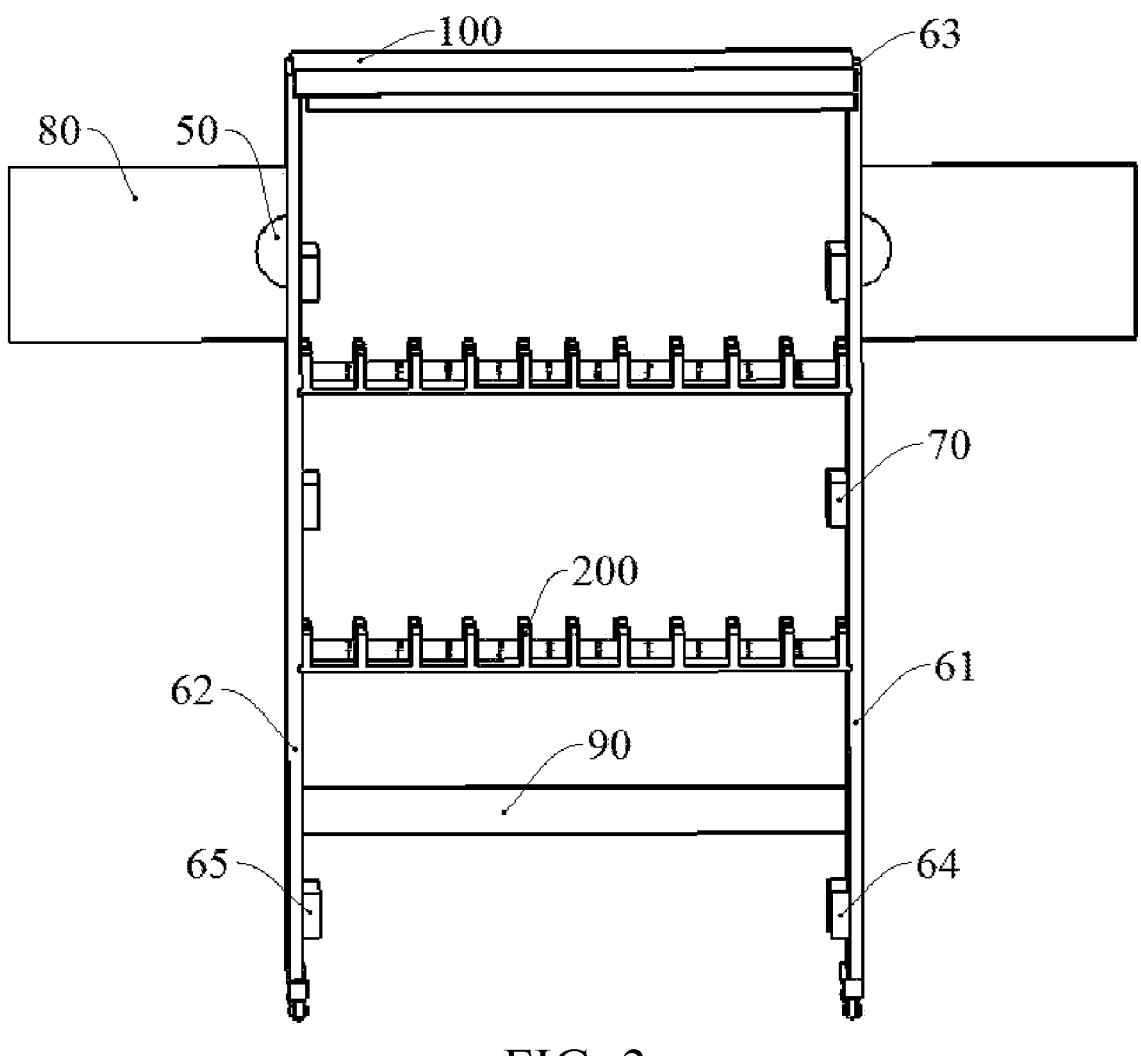
FIG. 3 is a schematic front structural view of a multimedia product burn-in apparatus according to an embodiment of the present invention.

As shown in FIG. 2 and FIG. 3, FIG. 2 is a schematic perspective view of a multimedia product burn-in apparatus according to an embodiment of the present invention, and FIG. 3 is a schematic front structural view of a multimedia product bum-in apparatus according to an embodiment of the present invention. The burn-in apparatus includes: a cabinet, which includes: a first side plate 61; a second side plate 62, arranged parallel to and spaced apart from the first side plate 61 in a first direction x (as shown in FIG. 2); a top support plate 63, located on top portions of the first side plate 61 and the second side plate 62, the top support plate 63 being connected to the top portions of the first side plate 61 and the second side plate 62 respectively in the first direction x; and a display 80, located on side walls of the first side plate 61 and the second side plate 62, the display 80 being connected to the several multimedia products 30 and configured to play video information provided by the several multimedia products 30.

The cabinet is configured to provide a storage space for the multimedia products 30. In this embodiment, the processing server 21 and the router 22 are located in the cabinet, and the controller 10 may be carried around according to requirements of the tester. In another embodiment, the processing server and the router may alternatively be arranged outside the cabinet.

In this embodiment, the controller 10, the processing server 21, and the router 22 are located in the cabinet, so that the controller 10, the processing server 21, and the router 22 are easy to transport and store. In another embodiment, the controller, the processing server, and the router may alternatively be located outside the cabinet.

In this embodiment, the first side plate 61, the second side plate 62, and the top support plate 63 are all sheet metal parts. In another embodiment, the first side plate, the second side plate, and the top support plate may alternatively be made of ABS engineering plastic.

The multimedia product burn-in apparatus further includes: a multiple input and one output switch 70, including an input end connected to the several to-be-tested multimedia products 30 and an output end connected to the display 80.

The multiple input and one output switch 70 collects video signals of the several multimedia products 30 and intermittently transmits the video signal of each multimedia product 30 to the display 80 in turn, so that the display 80 plays video information of the several multimedia products 30 in turn, or at the same time, the video signals of the several multimedia products 30 are transmitted to the display 80 simultaneously, so that the video information of the several multimedia products 30 is played simultaneously on the display 80. In this embodiment of the present invention, the multiple input and one output switch 70 is used to greatly reduce the loss and the cost of device configuration.

Specifically, the multiple input and one output switch 70 includes: a KVM (Keyboard Video Mouse) switch, a VGA (Video Graphics Array) switch, an AV (Audio Video) switch, a video switch, an HDMI (High Definition Multimedia Interface) switch, a DVI (Digital Visual Interface) switch, and the like. In this embodiment, the multiple input and one output switch 70 includes the HDMI switch.

In this embodiment, the multiple input and one output switch 70 takes turns transmitting the video signals of the several multimedia products 30 to the display 80 in various forms, for example: scheduled switching, such as switching the video output by a multimedia product 30 every ten seconds.

The display 80 is configured to play the video information transmitted by the multiple input and one output switch 70.

In this embodiment, the display 80 is rotatably arranged on the first side plate 61 and the second side plate 62, and a position of the display 80 on the first side plate 61 and the second side plate 62 may be adjusted as required.

It should be noted that the display 80 is located on the side walls of the first side plate 61 and the second side plate 62 that face away from the top support plate 63, so that the display 80 does not interfere with the structure inside the cabinet when the position is adjusted.

The burn-in apparatus includes: a camera 50, connected to the network server 20, the camera 50 being located on the side walls of the first side plate 61 and the second side plate 62, and the camera 50 being configured to capture playback screen of the display 80 and store a captured video in the network server 20; and a detection unit (not shown in the figure), configured to download the video stored in the network server 20 to the personal computer for detection.

It should be noted that the camera 50 is connected to the router 22 in the network server 20, and the captured video is stored in the router 22.

When the bum-in apparatus is working, the camera records the video screen played by the display 80, which means that it records the videos output by all multimedia products, which saves the tester from working overtime to watch the video played by the display 80 in the test process, and reduces the manpower cost and the time cost. In addition, the detection unit detects the video formed by the camera, replacing manual detection by the inspection personnel, further reducing the manpower cost and the time cost in the bum-in process, improving the efficiency of the burn-in inspection, and also reducing test errors caused by tester fatigue and improving the accuracy of burn-in detection.

It should be noted that the camera 50 and the display 80 are both located on the side wall of the cabinet, and the display 80 is rotatably arranged on the side walls of the first side plate 61 and the second side plate 62, which allows the screen played by the display 80 to be within a shooting range of the camera 50.

In this embodiment, types of the camera 50 include an analog camera or a digital camera. It should be noted that the camera 50 is located on the side walls of the first side plate 61 and the second side plate 62 that face away from the top support plate 63.

Specifically, a quantity of cameras 50 is two. The camera 50 on the first side plate 61 is configured to shoot the display 80 located on the first side plate 61, and the camera 50 on the second side plate 62 is configured to shoot the display 80 located on the second side plate 62.

The detection unit is configured to detect the captured video and determine the quality of the video provided by the multimedia product 30, thereby further determining hardware quality, software stability, and usability of the multimedia product 30 to ensure that the product delivered to the user can be used normally for a long time.

Specifically, the detection unit detects the playback screen of the video. In the detection process, the high-definition video source played by the multimedia product is set with white image segments or black image line segments at intervals, and the detection unit detects whether the white image or black image exists; and in the detection process, the detection unit takes screenshots of the video at regular intervals and compares the two screenshots on the timeline to determine whether there are differences in the screenshots. Interval time is, for example, 10 seconds, 20 seconds, and 30 seconds.

In this embodiment, the router 22 generates a wireless network. The wireless network connects the controller 10, the router 22, the processing server 21, and the multimedia product 30 together. In the burn-in process, under the connection of the wireless network, the processing server 21 receives the running command issued by the controller 10, generates a control command, and performs batch testing on the several multimedia products 30 based on the control command, which avoids a tester from repeatedly making individual changes to each multimedia product 30, achieves automated testing, and solves the problem of high manpower, material, and time costs caused by batch burn-in of the multimedia products in research and development and design stages. In another embodiment, a wired network may alternatively be used to connect the controller, the router, the processing server, and the multimedia product together, and the corresponding controller, router network server, and multimedia product have a matching network cable interface.

In this embodiment, the wireless network connects the multimedia product 30 and the router 22 to enable the multimedia product 30 to obtain the test file in the router 22 and enable the several multimedia products 30 to receive the control command.

In this embodiment, the wireless network further connects the network server 20 and the camera 50. Specifically, the router 22 in the network server 20 is connected to the camera 50, so that the video captured by the camera 50 is stored in the router 22.

It should be noted that the Internet Protocol versions used between the multimedia product 30 and the wired or wireless network include Internet Protocol version 4 (IPv4) or Internet Protocol version 6 (IPv6). If Internet Protocol version 4 is used, up to 255 multimedia products 30 can be carried; and if Internet Protocol version 6 is used, up to $2^{128}$ multimedia products 30 can be carried and Internet Protocol version 6 has unlimited scalability. Using Internet Protocol version 4 or Internet Protocol version 6 can meet the requirements of simultaneous testing of the several multimedia products, improve testing efficiency, and reduce testing costs.

The burn-in apparatus further includes: a temperature control system (not shown in the figure), located at a bottom portion of the cabinet and configured to regulate an internal temperature of the cabinet. In another embodiment, the temperature control system may alternatively be correspondingly arranged in the middle of the cabinet or a top portion of the cabinet according to the position of the multimedia product.

The temperature control system includes a hot air blower, a cold air blower, and a temperature controller connected to the hot air blower or the cold air blower.

The temperature controller is configured to control power of the hot air blower or the cold air blower in real time, thereby adjusting the temperature inside the cabinet in real time and simulating a changeable working temperature environment of the multimedia product 30.

The burn-in apparatus further includes: a heat preservation apparatus, located on two sides of the top support plate in a second direction y (as shown in FIG. 2), the second direction y being perpendicular to the first direction x.

Figure 4:
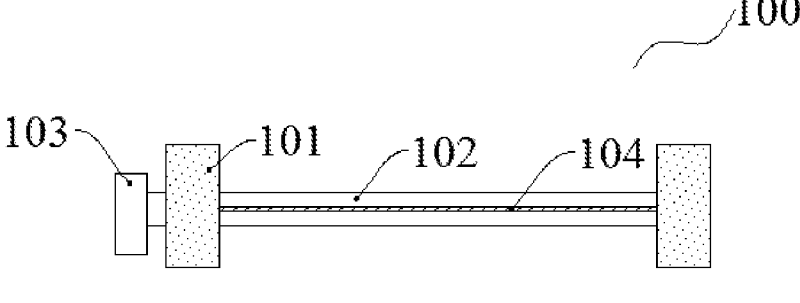
FIG. 4 is a schematic structural diagram of a roller shutter mechanism in a multimedia product burn-in apparatus according to an embodiment of the present invention.

As shown in FIG. 4, in this embodiment, the heat preservation apparatus includes a roller shutter mechanism 100 and an insulation curtain (not shown in the figure) connected to an output end of the roller shutter mechanism 100.

In this embodiment, the roller shutter mechanism includes: a support base 101, arranged at intervals at the two ends of the top support plate in the first direction; a scroll 102, rotatably arranged in the support base 101; a turning motor 103, including an output end fixedly connected to an end of the scroll 102 and configured to provide rotation of the scroll 102; and a connection mechanism 104, fixed to a surface of the scroll 102 in the first direction and configured to connect the insulation curtain.

When the roller shutter mechanism is working, through forward rotation of the turning motor 103, the insulation curtain covers the area between the first side plate 61 and the second side plate 62, so that the hot air or cold air provided by the temperature control apparatus is not easy to dissipate and can well simulate the working environment temperature of the multimedia product 30; and through reverse rotation of the turning motor 103, the insulation curtain can be folded, so that the multimedia product 30 between the first side plate 61 and the second side plate 62 is connected to the outside, and the multimedia product 30 can return to a room temperature as quickly as possible.

As an example, the connection mechanism 104 includes a fixing clip.

The burn-in apparatus includes: a wire groove 90 extending in the first direction, located between the first side plate 61 and the second side plate 62 and fixedly connected to the first side plate 61 and the second side plate 62, the wire groove 90 including a weak current conduit and a strong current conduit spaced apart from the weak current conduit.

The weak current conduit is configured to place a weak wire, such as a communication signal line, a control wire, and a low-voltage wire. The low-voltage wire is, for example, 5 V, 12 V, 36 V, and the like. The strong current conduit is configured to place a strong wire, such as a 220 V wire and a 380 V wire. The weak current conduit and the strong current conduit store the weak wire and the strong wire separately to avoid a strong magnetic field generated when the strong wire is energized from interfering with the communication signal line and the control line in the weak wire, making the communication signal line and the control line less likely to be affected; in addition, it can also prevent the strong current in the strong wire from flowing into the weak wire and causing a fire when an insulation layer of the strong wire is damaged.

The burn-in apparatus includes: a first power supply 64, arranged on the first side plate 61. The first power supply 64 provides a power supply with lower voltage, such as 5 V, 12 V, 36 V, and the like. Correspondingly, a wire or a signal wire drawn out of the first power supply 64 is located in the weak current conduit.

The burn-in apparatus includes: a second power supply 65 (as shown in FIG. 3), arranged on the second side plate 62, voltage of the second power supply 65 being higher than voltage of the first power supply 64. The voltage provided by the second power supply 65 is 220 V or 380 V. A wire or a signal wire drawn out of the second power supply 65 is located in the strong current conduit.

Figure 5:
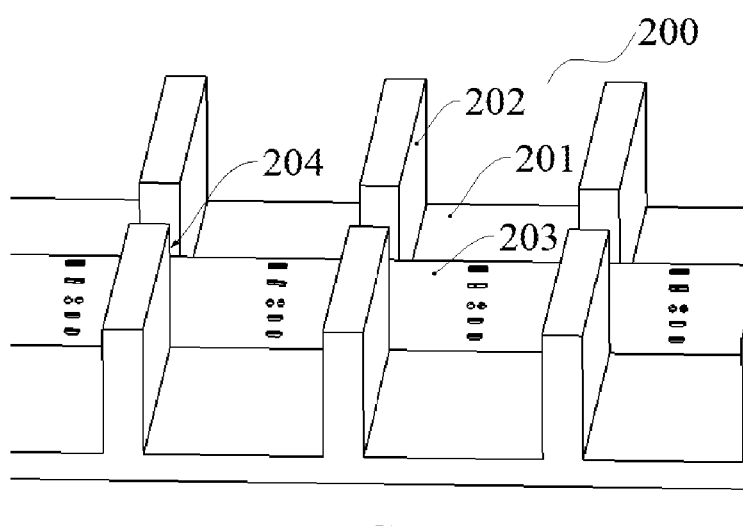
FIG. 5 is a schematic structural diagram of a distributed test rack in a multimedia product burn-in apparatus according to an embodiment of the present invention.

As shown in FIG. 5, the burn-in apparatus includes: several distributed test racks 200, and the distributed test racks are arranged on opposite side walls of the first side plate 61 and the second side plate 62.

The distributed test rack 200 provides a platform for testing the multimedia product 30, and a quantity of distributed test racks 200 may be adjusted accordingly according to a quantity of to-be-tested multimedia products 30.

Specifically, the distributed test racks 200 include: a support plate 201, fixedly connected to the opposite side walls of the first side plate 61 and the second side plate 62; and a plurality of partition plates 202, arranged on the support plate 201 at intervals in the first direction x, the partition plates 202 extending in the second direction y, and a center of the partition plates 202 in the second direction is provided with an opening 204.

The distributed test rack 200 further includes: a power supply module 203 (as shown in FIG. 5), arranged in the opening 204 of the plurality of partition plates 202 in the first direction, the power supply module 203 including a plurality of types of jacks and being configured to supply power to the several multimedia products 30 at the same time.

The opening 204 provides a placement position for the power supply module 203, and an area surrounded by the power supply module 203 and the adjacent partition plate 202 is used to provide a testing space for the multimedia product 30.

In this embodiment, the plurality of types of jacks include: a three-wire jack, a two-wire jack, a USB interface, a headphone 3.5MM Audio interface, an HDMI interface, and a Type-C interface.

The power supply module 203 has various jacks to easily adapt to burn-in test requirements of different multimedia products.

In this embodiment, the burn-in apparatus includes: a self-locking roller, located on a bottom portion of the cabinet.

When the cabinet needs to be moved, the self-locking apparatus in the self-locking roller is closed, so that the cabinet can be moved to a destination area. When the cabinet needs to be fixed, the self-locking apparatus in the self-locking roller is opened, so that the self-locking roller can no longer roll.

In this embodiment, the burn-in apparatus includes: a network port to serial port module, configured to connect the router 22 and the multimedia product 30.

The network port to serial port module can adapt to 10 Mbit/s mode and 100 Mbit/s mode. A maximum baud rate of serial communication is as high as 1.152 Mbps. It has TCP Client/Server and UDP working modes, and can be configured through software configuration, command configuration, and web page configuration.

The network port to serial port module is configured to realize data transmission between the router 22 and the multimedia product 30.

The foregoing descriptions of the disclosed embodiments enable a person skilled in the art to implement or use the present invention. Various modifications to these embodiments are obvious to a person skilled in the art, and the general principles defined in this specification may be implemented in other embodiments without departing from the spirit or scope of the present invention. Therefore, the present invention is not limited to these embodiments illustrated herein, but conforms to the broadest scope consistent with the principles and novel features disclosed in the present invention.

What is claimed is:

1. A burn-in apparatus for testing several multimedia products, comprising:

a controller configured to issue a running command; and a network server configured to be connected to the controller and the several multimedia products respectively, the network server storing a test file, and the test file being generated by matching a signature and a log of a multimedia product of the several multimedia products, wherein the network server receives the running command to generate a control command, sends the test file to the several multimedia products according to the control command, and performs batch testing on the several multimedia products.

2. The burn-in apparatus according to claim 1, wherein the network server comprises:

a processing server configured to receive the running command and generate the control command; and a router configured to store the test file and send the test file to the several multimedia products in response to the control command.

3. The burn-in apparatus according to claim 2, wherein the router configures a running environment and running software of the several multimedia products according to the control command.

4. The burn-in apparatus according to claim 3, wherein the burn-in apparatus comprises:

a cabinet comprising:

a first side plate;

a second side plate arranged parallel to and spaced apart from the first side plate in a first direction;

a top support plate located on top portions of the first side plate and the second side plate, the top support plate being connected to the top portions of the first side plate and the second side plate respectively in the first direction; and a display located on side walls of the first side plate and the second side plate, the display configured to be connected to the several multimedia products and further configured to play video information provided by the several multimedia products.

5. The burn-in apparatus according to claim 2, wherein the burn-in apparatus comprises:

a cabinet comprising:

a first side plate;

a second side plate arranged parallel to and spaced apart from the first side plate in a first direction;

a top support plate located on top portions of the first side plate and the second side plate, the top support plate being connected to the top portions of the first side plate and the second side plate respectively in the first direction; and a display located on side walls of the first side plate and the second side plate, the display configured to be connected to the several multimedia products and further configured to play video information provided by the several multimedia products.

6. The burn-in apparatus according to claim 1, wherein the burn-in apparatus comprises:

a cabinet, comprising:

a first side plate;

a second side plate arranged parallel to and spaced apart from the first side plate in a first direction;

a top support plate located on top portions of the first side plate and the second side plate, the top support plate being connected to the top portions of the first side plate and the second side plate respectively in the first direction; and a display located on side walls of the first side plate and the second side plate, the display configured to be connected to the several multimedia products and further configured to play video information provided by the several multimedia products.

7. The burn-in apparatus according to claim 6, wherein the burn-in apparatus comprises:

a multiple input and one output switch comprising an input end configured to be connected to the several multimedia products and an output end configured to be connected to the display.

8. The burn-in apparatus according to claim 6, wherein the burn-in apparatus comprises:

a camera configured to be connected to the network server, the camera being located on the first side plate and the second side plate, and the camera being configured to capture display playback screen and store a captured video in the network server; and a detection unit configured to download the captured video stored in the network server to the controller for detection.

9. The burn-in apparatus according to claim 6, wherein the burn-in apparatus comprises:

a temperature control system located on a bottom portion of the cabinet, wherein the temperature control system comprises a hot air blower, a cold air blower, and a temperature controller connected to the hot air blower or the cold air blower.

10. The burn-in apparatus according to claim 6, wherein the burn-in apparatus comprises:

a heat preservation apparatus located on two sides of the top support plate in a second direction, the second direction being perpendicular to the first direction.

11. The burn-in apparatus according to claim 10, wherein the heat preservation apparatus comprises a roller shutter mechanism and an insulation curtain connected to an output end of the roller shutter mechanism, wherein the roller shutter mechanism comprises:

a support base arranged at intervals at the two sides of the top support plate in the first direction;

a scroll rotatably arranged in the support base;

a turning motor comprising an output end fixedly connected to an end of the scroll and configured to provide rotation of the scroll; and a connection mechanism fixed to a surface of the scroll in the first direction and configured to connect the insulation curtain.

12. The burn-in apparatus according to claim 6, wherein the burn-in apparatus comprises:

a wire groove extending in the first direction located between the first side plate and the second side plate and fixedly connected to the first side plate and the second side plate, the wire groove comprising a weak current conduit and a strong current conduit spaced apart from the weak current conduit;

a first power supply arranged on the first side plate, a wire or a signal wire drawn out of the first power supply being located in the weak current conduit; and a second power supply arranged on the second side plate, a wire or a signal wire drawn out of the second power supply being located in the strong current conduit, voltage of the second power supply being higher than voltage of the first power supply.

13. The burn-in apparatus according to claim 6, wherein the burn-in apparatus comprises:

several distributed test racks arranged on opposite side walls of the first side plate and the second side plate;

wherein the several distributed test racks comprise: a support plate fixedly connected to the opposite side walls of the first side plate and the second side plate;

a plurality of partition plates arranged on the support plate at intervals in the first direction, the plurality of partition plates extending in a second direction perpendicular to the first direction, and a center of the plurality of partition plates in the second direction is provided with an opening; and a power supply module arranged in the opening of the plurality of partition plates in the first direction, the power supply module comprising a plurality of types of jacks and being configured to supply power to the several multimedia products simultaneously.

14. The burn-in apparatus according to claim 6, wherein the burn-in apparatus comprises a self-locking roller arranged at a bottom portion of the cabinet.

15. The burn-in apparatus according to claim 1, wherein the controller comprises a personal computer.

\* \* \* \* \*